(12) United States Patent
Gilbert

(10) Patent No.: US 10,199,827 B2
(45) Date of Patent: Feb. 5, 2019

(54) DEVICE FOR CONTROLLING A POWER LOAD IN AN ELECTRICAL NETWORK, AND ASSOCIATED METHOD AND SYSTEM

(71) Applicant: ERGYLINK, Levallois Perret (FR)

(72) Inventor: Jerome Gilbert, Levallois Perret (FR)

(73) Assignee: ERGYLINK, Levallois Perret (FR)

( * ) Notice: Subject to any disclaimer, the term of this patent is extended or adjusted under 35 U.S.C. 154(b) by 395 days.

(21) Appl. No.: 14/903,499

(22) PCT Filed: Jun. 26, 2014

(86) PCT No.: PCT/IB2014/062632
§ 371 (c)(1),
(2) Date: Jan. 7, 2016

(87) PCT Pub. No.: WO2015/004557
PCT Pub. Date: Jan. 15, 2015

(65) Prior Publication Data
US 2016/0149410 A1 May 26, 2016

(30) Foreign Application Priority Data

Jul. 8, 2013 (FR) ..................................... 13 01618

(51) Int. Cl.
*H02J 3/14* (2006.01)
*G05B 19/10* (2006.01)
(Continued)

(52) U.S. Cl.
CPC .............. *H02J 3/14* (2013.01); *G05B 19/102* (2013.01); *H02J 3/00* (2013.01);
(Continued)

(58) Field of Classification Search
CPC ........ H02J 3/14; H02J 3/00; H02J 4/00; H02J 13/00; H02J 2003/146; H05B 37/02;
(Continued)

(56) References Cited

U.S. PATENT DOCUMENTS 4,361,766 A 11/1982 de Montgolfier et al.
9,736,911 B2 * 8/2017 Taipale ............. H05B 37/0263
(Continued)

FOREIGN PATENT DOCUMENTS

EP 0 028 178 A1 5/1981
FR 2 636 142 A1 3/1990
(Continued)

OTHER PUBLICATIONS

International Search Report, dated Dec. 12, 2014, from corresponding PCT application.

*Primary Examiner* — David Lam
(74) *Attorney, Agent, or Firm* — Young & Thompson

(57) ABSTRACT

A device (1) for controlling the operation of a power load comprised in an apparatus (12) belonging to a terminal electrical installation (2) of an electrical network (16) on the basis of events that are related to the operation or management of the electrical distribution network. A method and the use of same for managing the power required in an electrical network via a plurality of devices, and a system including a plurality of devices for controlling the operation of a power load and an electrical distribution network are also described.

20 Claims, 5 Drawing Sheets

(51) Int. Cl.
*H02J 3/00* (2006.01)
*H02J 13/00* (2006.01)

(52) U.S. Cl.
CPC ....... *G05B 2219/2639* (2013.01); *H02J 13/00* (2013.01); *H02J 2003/146* (2013.01); *Y02B 70/3225* (2013.01); *Y04S 20/222* (2013.01); *Y04S 20/224* (2013.01)

(58) Field of Classification Search
CPC .......... G05B 19/102; G05B 2219/2639; Y04S 20/224; Y04S 20/222; Y02B 70/3225; Y02B 20/48
See application file for complete search history.

(56) References Cited

U.S. PATENT DOCUMENTS

| | | |
|---|---|---|
| 2007/0121512 A1 | 5/2007 | Schibli et al. |
| 2010/0217450 A1 | 8/2010 | Beal et al. |
| 2012/0143387 A1 | 6/2012 | Indovina et al. |
| 2014/0001977 A1* | 1/2014 | Zacharchuk ........ H04L 12/2816 315/291 |
| 2014/0207302 A1 | 7/2014 | Delon et al. |

FOREIGN PATENT DOCUMENTS

| | | |
|---|---|---|
| FR | 2 822 303 A1 | 9/2002 |
| FR | 2 947 396 A1 | 12/2010 |
| FR | 2 976 415 | 12/2012 |

* cited by examiner

DEVICE FOR CONTROLLING A POWER LOAD IN AN ELECTRICAL NETWORK, AND ASSOCIATED METHOD AND SYSTEM

TECHNICAL FIELD

The invention falls within the scope of electrical network management.

BACKGROUND OF THE INVENTION

The state of the art in terms of power load management in terminal electrical installations of an electrical network consists in controlling the power supply of those loads according to tariff conditions. The most well-known case is the control of the operation of an electric water-heater according to off-peak rates/peak rates. As a result, the technical solutions implemented for controlling power loads in terminal electrical installations are in fact solutions for tariff management as shown in patent FR2947396. Energy meters usually include a remote control receiver used to change the metering indices according to pricing periods as for example in patent FR2636142. These state-of-the-art meters include a control relay designed to control an external power relay for automatically controlling the operation of the water heater according to the tariff status. In modern electrical networks, which are becoming increasingly complex as shown in patent FR2976415, which include an increasing proportion of variable production, and infrastructures close to saturation in front of constantly growing needs. Therefore, an active management of demand for energy becomes increasingly essential to avoid the risk of failure of electrical networks which could even lead to the blackout of entire regions.

This invention falls within the scope of so-called "Smart grids".

SUMMARY OF THE INVENTION

The object of the present invention is to at least partly find a remedy to the problems mentioned earlier by proposing a device for controlling the operation of a power load belonging to a terminal electrical installation according to events connected to the operation or management of an electric network. This device can advantageously be used by the manager of an electrical network to maintain optimal operation through the use of resources in the terminal electrical installations. Several variants of the device according to the invention have been provided for, and can be implemented alone or in combination within an apparatus. The terminal installations in which it is provided to implement the invention belong to the so-called low-voltage part of an electrical network. The aim is more often to control single phase power loads supplied by an alternating voltage which is for example 230 V at a frequency of 50 Hz in Europe and 110 V at a frequency of 60 Hz in North America. The invention may also be implemented in three phase terminal installations and/or to control three phase loads as appropriate.

The invention aims a device for controlling the operation of a power load belonging to a terminal electrical installation according to events which are related to the operation or management of an electrical network. The device according to the invention comprises:
  a functional block configured for extracting at least one setpoint from the voltage of said terminal electrical installation; and
  a functional block for controlling a power load according to at least one setpoint.

Power load is understood as a single power load or a plurality of elementary charges controlled collectively or in a differentiated way.

The control of the power load is understood as being all or nothing, i.e. the power load being set ON at full power or OFF, or as a setting of intermediate functional statuses. The functional so-called intermediate statuses correspond to a power demand on the electrical network that is not zero and that is lower than the maximum power of the load.

Extracting at least one setpoint from the voltage is of particular value in that the device may be installed everywhere inside the terminal electrical installation, even off the electric panel which usually concentrates all the electrical circuits of the installation. Some of the implementation variants therefore include the device according to the invention, directly in electrical apparatuses like electric water heaters, cooling or heating apparatuses comprising one or several power loads like heating resistor or thermodynamic group etc. The inclusion of the device in the apparatus containing at least one power load also offers the advantage of smarter management of at least one load, for example by taking into account internal operating cycles or constraints of use. This also allows the management of several power levels in the load, the sequencing of the switching-on of at least one load over the time for maintaining a minimal service level, the permanence of the power supply of functionalities of the apparatus that do not involve the power load etc.

The device according to the invention includes means for switching the electrical supply of the power load to be controlled.

It is the easiest way to control external power loads without related intelligence such as electrical hot water production apparatuses or heating systems based on the use of power elements. However, for the invention implementation variants that are integrated in apparatuses, or to control power loads requiring taking into account an operating cycle, the addition of an appropriate interface between the electronics of the device according to the invention and the electronic management of the power load in the apparatus is provided. Such an interface may for example be based on the use of one or more optocouplers.

In the case where the device includes means for switching the electric supply of the power load, it is advantageous that the load is being supplied by default.

In preferred variants of standalone implementation of the device which include power switching means, for example an electromechanical or an electronic relay, the device is fitted in such a way as to ensure that the power load is supplied through the usually closed contacts of the relay so that the power may still be supplied and service guaranteed in the event of failure of the device according to the invention. This is all the more relevant given that the device according to the invention is more useful to the operator of the electrical network than to the user of the apparatus.

The device according to the invention also includes means for controlling remotely a power load integrated into an apparatus which may be remote controlled.

This may be a wireless remote control transmitter, for example infrared or radiofrequency, whose physical layer and control coding is adapted to control the operation of an apparatus containing one or several power loads. This variant allows the device according to the invention to be implemented in the form of an operational accessory of the apparatus to be controlled and/or simplify the functional coupling of the device with a sophisticated external apparatus. This variant of the invention is particularly suitable for controlling reversible or non-reversible air conditioners that include a remote control receiver.

This may also be a wired remote control such as an interface capable of controlling one or more power apparatuses offering an optional control input (e.g. a so-called "pilot wire" input) such as electric heaters.

It may be also a wired or wireless interface between the device and a home automation system or a building control system capable of acting on the functional status of one or more power loads in the relevant terminal electrical installation.

A first variant of the device is provided in which the functional extraction block of at least one setpoint from the voltage of the terminal electrical installation is a ripple control signal receiver, with at least one setpoint being a remote control command. This variant of the invention is intended to be installed in electrical networks where tariff management infrastructure is based on ripple control. This type of remote control is based for example on pulse modulation of a sinusoidal signal at 175 Hz or 188 Hz superimposed on the mains voltage. The frequency and coding scheme differ in each country.

A second variant of the device is provided in which the functional extraction block of at least one setpoint from the voltage of the terminal electrical installation is a receiver of remote control signals transmitted by Power-Line Communication (PLC), the at least one setpoint being a remote control command.

This variant of the invention is intended to be installed in electrical networks where tariff management infrastructure uses power-line communications, at least in its low voltage part serving terminal electrical installations. These may, for example, be transmissions of remote controls and remote meter reading according to IEC 61334 and IEC 62056 standards as in France or according to other standards that differ in each country. It should be noted that, if for the purposes of tariff management, electricity meters must implement a bidirectional power-line transceiver; substantial savings could be made in the device according to the invention by only implementing the receiving part of a power-line communication transceiver. The electric consumption of the device would also be advantageously reduced by the absence of the emitting part.

It is also provided that the device according to the invention comprises means for receiving remote control signals transmitted by radio frequency, as at least one setpoint is a remote control command.

This variant of the invention may be installed for example in electrical networks where tariff management infrastructure already uses radio transmission means. This may include short range radio frequency transmission means (ZigBee, Bluetooth, Wi-Fi or other equivalent standards and successors), or longer range wireless telecom networks (e.g. GSM 1G to 4G or equivalent and successors).

Of course, the use of any other type of communication network, for example optical, wired or wireless to transmit commands to the devices according to the invention is possible without departing from the scope of the invention.

The invention further provides that the functional extraction block of at least one setpoint from the voltage of the terminal electrical installation uses the value of the voltage and/or from its evolution over the time for deducing the at least one setpoint.

This feature can result in a standalone implementation variant of the device according to the invention. The autonomy of the device in this variant is based on the fact that it requires no remote control from the network manager. The detection of the problem on the electrical network and the corresponding action on the power load are in fact managed locally in the device. The fully decentralized and diffuse management of the network resulting from the implementation of this variant of the invention is cost-effective in terms of infrastructure and particularly effective in terms of reaction time. Furthermore, this variant of the invention may be advantageously combined with preceding variants. In fact, its implementation in the aforementioned variants of the invention only requires very few additional resources. In particular, when the invention is implemented in a microcontroller according to preceding variants, the implementation of this functionality requires little software and few or no additional electronic components. This variant of the invention may for example be used to allow the electrical network to self-stabilize faster than any other solution based on centralized network management and remote controls. This is done using the power loads of terminal installations to absorb oscillations which may arise in the electrical network in some circumstances. Thus fitted, the device extracts a setpoint from voltage available at its terminals allowing it to automatically supply the power load it controls for a short period of time which may range from a few dozen seconds to several minutes.

The extraction of the setpoint may for example take into account the amplitude of the voltage supplying the terminal installation and the variation speed of this amplitude for detecting an oscillatory phenomenon on the network.

In another implementation variant that can also be combined with the previous ones, the invention allows automatic disconnection of power loads in the event of an abnormally low voltage for a period exceeding a predetermined value that is a sign of probable overload of the electrical network that can cause a blackout. Solutions for spreading the peak at reconnection of power loads will be advantageously implemented, such as those that will be described later, to avoid recreating later an overload and/or to prevent the occurrence of any oscillatory phenomenon. This functional variant of the invention, if it is implemented widely in a given territory, is particularly interesting in that it allows the providing of an electricity distribution service self-protected against the risks of cut-off and ensures a permanent basic service for supplying low-power apparatuses such as food refrigeration, lighting, consumer electronics and power apparatuses with short operating times such as cooking apparatuses.

The invention also provides that the functional extraction block of at least setpoint from the voltage of the terminal electrical installation uses the value of the frequency of the alternating voltage and/or its evolution over the time for deducing at least one setpoint. It is, like the previous one, a so-called standalone variant of the invention with which it can also be advantageously combined. For example, the device may automatically connect the power load it controls when the frequency of the alternating voltage exceeds a threshold. The device may also automatically disconnect the power load it controls when the frequency of the alternating voltage falls below another threshold. Solutions for spreading the peak at reconnection of power loads will be advantageously implemented, such as those that will be described later, to avoid recreating later an overload and/or to prevent the occurrence of any oscillatory phenomenon. Increasing the share of renewable and/or decentralized electricity such as wind or solar energy in the energy mix of modern electrical networks exposes those networks to the risk of an alternating voltage frequency trip far outside its nominal value. To avoid this risk, distributors for example limit the share of renewable and/or decentralized production units to about 30%. General implementation of devices according to the invention could increase the proportion of non-conventional production in the energy mix without increasing the complexity of electrical network management or without requiring heavy investment.

In a variant of the invention, the reception of at least one first setpoint puts the power load in a determined functional status for an indefinite period of time, the putting of the power load into another functional status requiring the reception of at least one second setpoint associated with this other functional status.

This variant of the invention corresponds to its implementation in a traditional context of centralized network management. This variant involves the transmission of a high number of remote controls and, if possible, uses precise solutions for addressing the terminal installations. However, the device according to the invention nevertheless allows the network manager to act independently on electrical power demand and on tariff management while sharing the same infrastructure equipment for both uses.

Another variant of the invention provides that at least one change in the functional status of the power load is consecutive to the expiry of a delay time.

This variant in the implementation of the invention is particularly preferred in that it helps to decrease drastically the volume of remote control commands to be transmitted in the case of centralized network management.

The delay times of the invention depend on implementation contexts. They can for example be a few tens of seconds when it comes to absorbing oscillatory phenomena by implementing an action-detection reflex arch entirely locally managed in the devices. Delay times may reach up to several hours, or even several days, in the frame of the centralized management of the electrical network by the operator. The implementation of long, or even very long, delay times raises no technical or economic problems when it is based on programming resources within components such as microcontrollers.

Thus, it is provided that at least one setpoint puts the power load into a defined functional status. The power load being automatically put into another functional status on arrival at the expiry of a delay time.

It is also provided that at least one setpoint puts the power load in a determined functional status on arrival at the expiry of a delay time. The power load being put into another functional status by at least one other setpoint associated with that other functional status.

It is also provided that at least one setpoint puts the power load into a determined functional status on arrival at the expiry of a first delay time. The power load being automatically put into another functional status on arrival at the expiry of a second delay time.

The invention plans that the delay time is registered in a temporal chart whose number and length of elementary steps are predetermined.

In a more particularly preferred implementation mode of the invention, it is provided that the delay time comprises a variable part which is specific to each device.

The purpose of this variant of the invention is to add a local variability within each device, for example to spread the power peak demand in the electrical network on arrival at expiry of the delay times causing the reconnection of power loads initiated by the reception of the same command by remote control. Technical solutions in which the variability is the highest from one device to another will be preferred, this in order to introduce the largest possible temporal diversity within the network.

The invention also provides that the delay time includes at least one variable part calculated from a random variable.

It is a way for generating a local variability with the aim of desynchronizing reconnection moments, and, to a lesser extent, disconnection moments, of loads within the same electrical network to mainly reduce cut-off risks. In practice the implementation of a generator of pseudo-random numbers using a simple algorithm is sufficient to get the required desynchronization effect.

The invention also provides that the delay time includes at least one variable part calculated by taking into account a unique number associated to the device or to the terminal electrical installation in which it is installed.

This is another way to generate local variability.

The invention provides that the delay time includes at least one variable part calculated by taking into account an environmental local variable.

This is another way to generate local variability. This environmental variable can be of all kinds to maximize the chances of being different from one device to another. It can for example be a temperature, the value of an electric field etc. measured in the device.

The invention provides that the variable part of the time delay is at least partly used as part of priority management in access to electrical power.

It is a functional refinement of the invention to reconnect power loads according to a predetermined priority level, for example based on characteristics of the terminal installation or in connection with the user. For example, this can be used for determining priorities to electrical power access in the frame of a priority given to public services like healthcare. The invention can also be implemented in the frame of priority levels for the access to the electrical power according to services subscribed by the user. The management of priorities according to the invention can also be implemented differently within the same terminal installation, for example on the basis of the type of use, the priority levels for example are determined according to inertia or the use of the apparatus controlled and/or depending on the power of the load.

It is also provided in the invention that the duration of all or part of the delay time which leads to a change in the functional status of the power load can be modified by the reception of at least one second remote control command over a period of time of a predetermined duration which starts from the reception of a first remote control command.

The at least one second remote control command can be dedicated to the modification of all or part of the delay time or it may be at least one repetition of an identical command to said first command. In this case, said first remote control command is differentiated from its repetitions aimed at only modifying the duration of all or part of the delay time in the fact that it is received after a period of time exceeding a predetermined value for which none of the remote control commands in question must be received by the device.

It is also provided in the invention to reuse of the same commands as much as it is possible to do so without limiting the possibilities of the system.

Furthermore, in the case of particularly sophisticated variants of implementation, it is provided to give the possibility of modifying delay times not only for increasing them but also for decreasing them, with respect to a predetermined initial value. For example, the same remote control command interpreted by the devices as a request to reconnect the power load to the electrical network as part of said first command, can be interpreted as an order to increment an elementary predetermined delay time when it is received as an at least one second order. Conversely, a command interpreted as an order to disconnect from the electrical network as a first command can be interpreted as an order to decrement the length of the delay time when it is received as an at least one second order.

It is also provided that each reception of at least one second remote control command resets the time slot during which the reception is taken into account by the device. This allows a modification in the duration of all or part of the delay time which leads to a change in functional status of the load over a wide range of values through a number of repetitions which is not limited by the duration of the initial time slot.

In addition, when the communication system used to transmit remote control commands to the devices offers selective addressing capabilities, it is then possible to modify selectively all or part of the delay times of the devices in the electrical network, according to criteria defined by the operator.

Active management of the delay time lengths of the devices is particularly effective for increasing the crushing effect on the peak of power demand in the electrical network. It also offers additional management capabilities to the network manager without complexifying network management or without requiring the use of additional specific remote control commands. Indeed, traditional centralized remote control systems prior to the "Smart grid" generation have few commands available for uses other than those related to metering and tariff management. In addition, these are remote controls addressing a large number of installations in an undifferentiated way and therefore likely to cause high power spikes that only the implementation of this variant of the invention can smooth out. This helps to obtain a spread effect over the time of the demand of power from the terminal part of the electrical network. In the most recent systems where there are sophisticated addressing capabilities including the selection of a single terminal installation as the recipient of a remote control command, the implementation of the invention leads to a considerable reduction in traffic and to a better system responsiveness. The implementation of the invention only requires the broadcast of only one command for having an effect a plurality of terminal installations. The spreading of the power demand peak without the invention would require the transmission of as many remote control commands as there are individual installations to be selectively addressed.

It is also provided that the reception of a remote control command restarts the delay times which have not expired, the devices in which the delay time has expired being insensitive to any new reception of a remote control command during a predetermined period of time.

This variant is particularly effective in its ability for spreading peaks of power in an electrical network.

The invention provides that the device also comprises a human-machine interface that allows the user to make the device insensitive, at least temporarily, to any setpoint to which it would normally be sensitive, and/or to impose at least one functional status to the power load.

The aim is to provide the technical possibility for users of apparatuses which include power loads controlled by a device according to the invention, to derogate to the requirements of electrical network management by allowing them to impose the functional status of their choice to the apparatus, at least temporarily. Indeed, contrary to the state of the art where power loads are controlled according to the tariff of electricity rigorously for each installation for contractual reasons, the invention is only effective for the network manager if it is implemented in a large number of installations. Therefore, if a few users choose to remove their installation from the power management mechanisms according to the invention, this is of no importance from the point of view of the network manager. Similarly, tolerances can be relaxed if necessary for technical or economic reasons in the implementation of the invention compared to solutions dedicated to tariff management insofar as the system as a whole is tolerant to a few episodic individual malfunctions (technical characteristics like the sensitivity thresholds of remote control receivers or their immunity to harmonic disturbances can be relaxed without problem). This being said, except in case of manual setting of the power loads to off status that may be intentionally permanent, it is advisable to implement solutions for an automatic return of the devices to the automatic functional mode of the invention. For example, an automatic return after a maximum time in derogated mode or by the occurrence of a determined number of appropriate setpoints.

The invention provides that in a particularly advantageous implementation mode, means of control are designed so that the next user's action on them will have the most expected effect given the current functional status of the device.

This is an improvement of the previous technical feature whose goal is to improve by prediction the usability of a device that usually is implemented in the form of a relatively basic device that may only have one single button and one or two lights to interact with the user for all its functions.

It is also provided that the device according to the invention comprises interfaces for being installed between two apparatuses installed for controlling a power load according to the tariff of electric energy in a terminal electrical installation. For example, it is provided in an installation variant to insert the device according to the invention between an output of the electricity meter, which is normally intended to control the power load of an installation such as an electric water heater, and the power relay that is normally present in the electrical panel for switching the load supply. An output for controlling other power loads of the installation, for instance electric heaters, by radiofrequencies by power-line communication or by pilot wire, can advantageously be added to the device according to the invention for increasing the total power of loads controlled intelligently according to the invention in this installation, while taking into account the tariff of electric energy.

In another variant of the invention combining the control of a power load according to the invention and the control according to the tariff of electric energy, it is provided to carry out the combination, within the same device, of information for power load management according to the invention and tariff information. This variant "all-in-one" allows an economy of resources and brings to the installer some degree of freedom concerning the location of the device within the terminal electrical installation. This variant of the device may also include means for switching the power supply of the controlled load, or any relevant interface for the same purpose, for forming a sub-system of standalone management of the power load which takes into account the tariff of electric energy.

The invention also provides a method for managing an electrical network by using a plurality of devices for controlling the operation of a power load belonging to a terminal electrical installation. The method according to the invention comprises the steps of:

extracting at least one setpoint from the voltage of the terminal electrical installation and/or from the reception of a remote control command;

modifying the functional status of the power load according to said at least one setpoint and/or to the expiry of a delay time;

allowing the user to impose at least one functional status of the power load controlled by said device, and/or to inhibit, at least temporarily, any automatic modification of at least one functional status of said power load.

The method according to the invention also provides a fully standalone power load management step based on a setpoint locally extracted from its supply voltage. This step forms a local reflex-arc capable of short response times between the detection of an event forming a setpoint which affects the value of the alternating voltage supplying the device and/or the frequency of this alternating voltage and the corresponding action on the power load controlled by the device.

The method according to the invention also comprises a step of desynchronization of at least one change in functional status of power load controlled by a device according to the invention, relatively to changes in functional status of at least one other power load controlled by at least one other device according to the invention within an electrical network having a similar effect in terms of power demand to the network.

This can be done by implementing, for example, the technical solutions based on variable delay time in each device described previously. The status changes which are desynchronized according to the invention may not be strictly identical as they could depend on specific technical characteristics of a given apparatus which includes a power load, or on the user's wishes. Thus, changes in status will therefore be desynchronized having the same effect in terms of power demand to the electrical network, i.e. changes of functional status leading to less power demand to the network even though the changes do not lead to complete shutdown of loads. Likewise, changes in status will be desynchronized if they lead to more power demand, even though these changes do not lead to maximum power demand.

The invention also provides a system for managing an electrical network which comprises:

a plurality of devices for controlling the operation of a power load belonging to a terminal electrical installation according to events which are related to the operation or management of an electrical network; and an electrical network to which said terminal electrical installation is connected and of which the voltage at the connection point is likely to allow the extraction of at least one setpoint in each of said devices.

It is provided that the system according to the invention further comprises at least one management software based on modeling of the behavior of said devices in the electrical network to help run the network and/or for automatic running of the network. Indeed, devices for controlling the operation of a power load belonging to a terminal electrical installation according to events which are related to the operation or management of an electrical network, and the associated method, have a deterministic operation that can be modeled. Therefore, software implementing the behavioral model of the system according to the invention is advantageous for predicting the remote controlling actions to be executed by the network operator, as well as their chronology depending on the operating constraints of the moment. Operating constraints can for instance be the total electric power forecasts available in the network or in the relevant part of the network for managing the devices and the corresponding power demand that is expected over the same period. It is also provided to take into account the management of tariff of electrical energy in the frame of a particularly optimized management of the system.

In a preferred implementation variant of the invention, the system control software according to the invention is connected to the remote control means used to transmit commands to the devices in the relevant electrical network, and to the upstream system for operation and supervision, allowing thus an automated operation of the system according to the invention.

BRIEF DESCRIPTION OF THE DRAWINGS

Other advantages and characteristics of the invention will become apparent upon examining the detailed description of embodiments which are by no means limiting and the appended drawings wherein, According to the first aspect of the invention.

PREFERRED EMBODIMENTS

Figure 1:
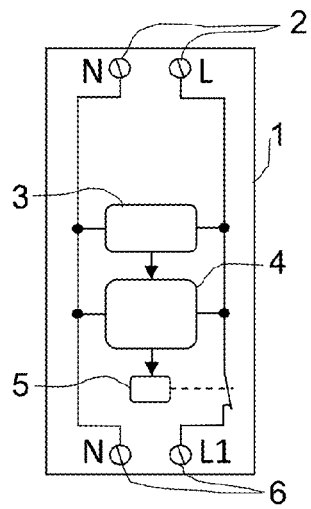
FIG. 1 illustrates a first variant of the device.

For controlling the operation of a power load in a terminal electrical installation according to events in connection with the operation or the management of an electrical network, such as a deficit or surplus of generation resulting from failure or hazard characteristics of intermittent sources of energy generation, the preferred way of implementing the invention is based on the combination of the operation of the value of the frequency of the AC voltage and/or its evolution over time, which informs the device on the overall balance of the electrical network, and operation of the voltage and/or its evolution over time, which informs the device on the local balance of the electrical network.

For example, the electrical network frequency range in which the frequency has no effect on the device is framed by a lower limit below which the controlled load is automatically disconnected from the electrical network and an upper limit above which the load is automatically connected to network.

In addition, the network voltage is tested continuously for at least automatically disconnect the load below a lower limit.

In certain preferred implementation variants, the controlled load is automatically connected to the electrical network over a high limit if its technical characteristics allow it to withstand voltage surges.

Some more preferred variants, implement an algorithm which track voltage changes in time to act on the controlled load accordingly before the voltage or frequency reach a critical threshold. Indeed, electrical distribution networks typically include servo such as on-load tap transformers, i.e. a plurality of variable transformer transformation ratio controlled by a controller, as well as capacitor banks controlled by automata.

These technical means involved in the voltage setting in the terminal branches of the power station, and which are based on discrete switching, producing voltage changes stepwise readily usable by the devices of the invention. The invention also provides to monitor the tension when the means used for its setting are continuously variable as in the case of decentralized controllable production means.

Appropriate algorithms are for example used for detecting the occurrence of an imbalance between production and consumption as well as the sense of imbalance. This is done from the direction of change of the voltage and the changing times between each tier or yet from the speed of a continuous variation of the voltage. Such algorithms are for example able to discriminate the meaning of an increase in the device supply voltage according to the evolution of the voltage in time.

Indeed, if the variable time is not taken into account, the increase in the voltage value can mean, at the upper end of the automatic adjustment range, power surge resulting from a surplus production that requires a connection of the load controlled for loading the network. It can also mean the fall of the tension in the high and medium voltage portions of the network caused by consumption higher than the production, this fall in the value of the voltage being offset in the terminal branches of the network by automatic adjustment of the voltage according to the load.

In the latter case, the appropriate action for the device is the disconnection of the controlled load. The invention thus makes it possible to take appropriate action on the controlled load before a low or high limit of the frequency or of the voltage is reached. The reaction time of the device is indeed an important feature to the extent that, the more it is short, less the primary reserve of the electrical network is used in the event of lack of production, and less large are the energy losses in the case of overproduction.

It is advantageously provided in certain preferred embodiments to implement a temporal spreading according to the invention for the return to the initial functional state of the load.

Some preferred embodiments implementing the invention further comprise means for receiving remote control signals whose effect on the functional state of the controlled load is, according to the selected variants and/or according to the received remote control commands, at the same priority level, prioritary, or at a priority level lower than that of the at least one setpoint extracted from the frequency and/or of the voltage.

In certain preferred embodiments, the reception of remote control commands is also expected to impose operating conditions to the device according to the invention such as durations, time ranges or predetermined conditions for the return to the initial functional status. The initial functional status change being caused by the reception of a remote control command and/or or by an autonomous decision of the device resulting from the operation of the value of the frequency of the alternative voltage and/or its evolution over time, and/or of the operation of the voltage and/or its evolution over time.

The invention, especially when it is implemented according to a preferred embodiment, is particularly adapted to permit at all times maintaining the balance between the power produced and the power consumed in an electric network by acting on the consumption by the appropriate control of a plurality of power loads.

DETAILED DESCRIPTION OF FIGURES AND OF PREFERRED EMBODIMENTS

Other particularities and advantages of the invention will further become apparent in the description hereafter. In the appended drawings given as non-limiting examples:

FIG. 1 illustrates a first variant of device 1 connected to the voltage of electrical installation 2 between phase and neutral for its power supply and for the extraction of at least one setpoint. This variant comprises a ripple control receiver 3, a functional control block 4 of a relay 5 which supplies or not an external power load via a connector 6 depending on received commands.

Figure 2:
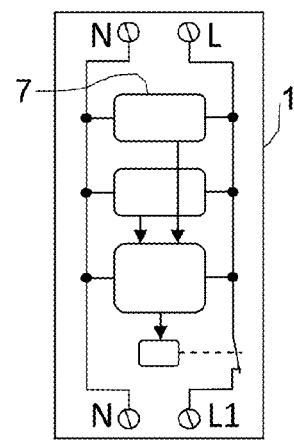
FIG. 2 illustrates a second variant of the device.

FIG. 2 illustrates a second variant of device 1 that adds to the variant of FIG. 1 a functional block 7 for extracting setpoints based on the analysis of the voltage value and of its frequency.

Figure 3:
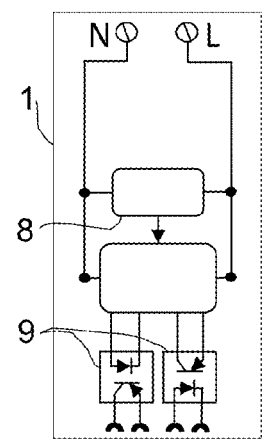
FIG. 3 illustrates a third variant of the device.

FIG. 3 illustrates a third variant of device 1 which differs from the variant of FIG. 1 by the presence of a remote control receiver using Power-Line Communications 8, and an interface providing functional continuity with the control electronics of a device 12 including a power load. This interface uses optocouplers 9. A first optocoupler allows the device according to the invention to act on the power load through the own electronic control of the apparatus. A second optocoupler allows the use of the control means of the apparatus, such as a keyboard and an existing screen, to adjust the operating settings of the device according to the invention. Any transmission protocol known by any ordinary skilled person in the art can be used to perform a one-way communication from the device to the power load, or a two-way communication in more sophisticated variants operating the human-machine interface of the apparatus to allow the user to control or to configure the device according to the invention.

Figure 4:
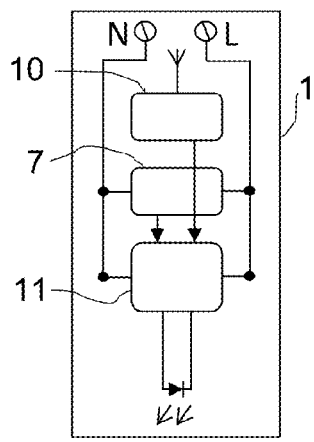
FIG. 4 illustrates a fourth variant of the device.

FIG. 4 illustrates a fourth variant of device 1 which differs from the previous ones by the presence of a remote control receiver by radio frequency 10 capable of receiving management commands from the network in electrical systems where radio transmission solutions have been selected for communicating with terminal installations. This example includes a functional block 7 for extracting setpoints based on the analysis of the value of voltage and/or of its frequency. It also includes a remote control transmitter 11 which can control the power load via the control electronics of the apparatus containing it without having to modify it. The features of the remote control transmitter 11 are adapted to the apparatuses to be controlled. This example implements an IR blaster which is sufficiently powerful and omnidirectional for using reflections on the ceiling and on the walls and allows easy installation without fine-tuning its orientation in the room containing the apparatus to be controlled.

Figure 5:
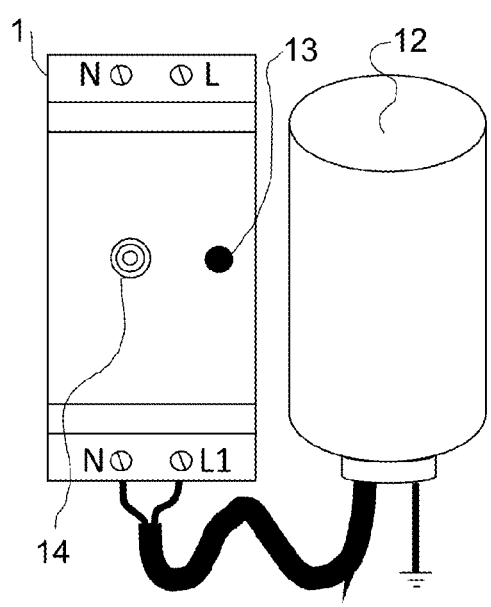
FIG. 5 illustrates a device controlling an external power load.

FIG. 5 illustrates a device according to the invention which controls an external apparatus 12 comprising a power load like an electric water heater. The device is in this example contained in a standard "rail DIN" type modular box designed for an installation in an electric panel. All other types of box as well as a standalone installation or an installation embedded at the foot of the power load are made possible by the technical characteristics of the invention. The device in this example comprises a button 13 which allows the user to impose the functional status of his choice to the power load. At least one indicator 14 or a screen allows the installer to configure the device according to the invention during the first installation. These feedback means then allow the user to know the functional status of the device and of the power load it controls. In this non-limiting example, it is provided that the user can use button 13 to select the four functional statuses that are "reception of remote control commands from the network enabled and power load supplied", "reception of remote control commands from the network enabled and power load not supplied", "reception of remote control commands from the network disabled and power load supplied", and "reception of remote control commands from the network disabled and power load not supplied". The corresponding functional status is displayed on indicator 14, respectively, fast blinking, slow blinking, light on permanently, and light off permanently. This example implements refinements designed to compensate the limitations of physical means implemented for the purpose of ergonomics. Thus the operating mode, where the device is insensitive to commands of the network and where the power load is supplied, is temporarily maintained by a delay time whose expiry causes the automatic reactivation of the reception of the commands of the network. When a button has not been pressed for more than 10 seconds, the next press is directly the most likely starting from the current functional status. Thus, when the device is in the "reception of remote control commands from the network enabled and power load supplied" status or in the "reception of remote control commands of from the network enabled and power load not supplied" status and the button has not been pressed for more than 10 seconds, then the next press on the button imposes the most likely status which is "reception of remote control commands from the network disabled and power load not supplied." Similarly, starting from the latter status, a single push on the button after at least 10 seconds keyboard inactivity leads directly to the most likely status that is "reception of remote control commands from the network enabled and power load supplied". When the button is pressed successively and the 10 seconds of keyboard inactivity timeout is not reached, all the possible functional statuses are explored in a looped sequence. Of course, implementation choices may be different without departing from the scope of the invention.

Figure 6:
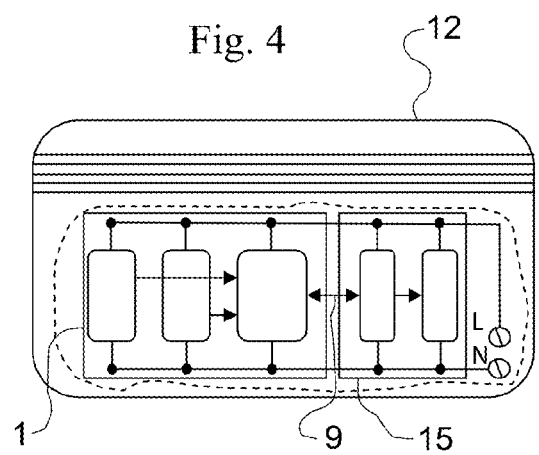
FIG. 6 illustrates the integration of a device into a power apparatus.

FIG. 6 illustrates the integration of device 1 in an apparatus 12 comprising a power load. The device according to the invention may not take the form of an apparatus as such. It can be directly integrated into the electronic subset of an apparatus comprising a power load as in the example of a heating or of an air conditioning apparatus. The integration of device 1 in apparatus 12 can be complete on the functional level and physically indistinguishable from the native control electronics of the apparatus, in particular when the invention is mainly implemented in the form of software in a microcontroller. The integration can also be performed as shown in FIG. 6 in the form of a separate functional module 1 which is added to the native electronics of the apparatus 15. An appropriate interface 9 on the mechanical, electrical and logical levels is implemented to ensure the interoperability of the two subsets.

Figure 7:
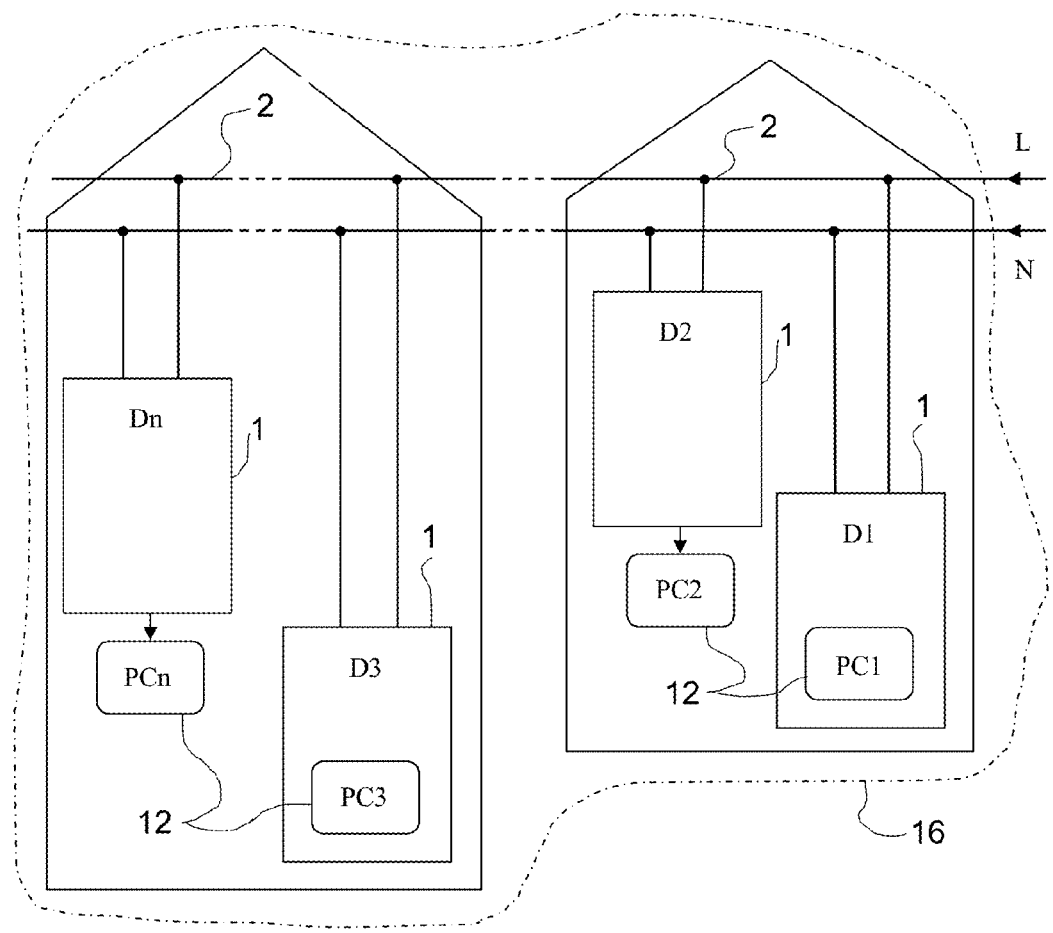
FIG. 7 illustrates an electrical network comprising devices.

FIG. 7 illustrates a network 16 comprising a plurality of devices 1 implemented in terminal electrical installations 2. The devices according to the invention control power loads included in external apparatuses 12 or devices are incorporated into apparatuses 12 comprising at least one power load.

Figure 8:
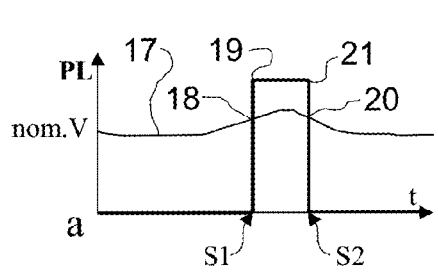
FIG. 8 illustrates a standalone variant operating the voltage value.
Figure 8:
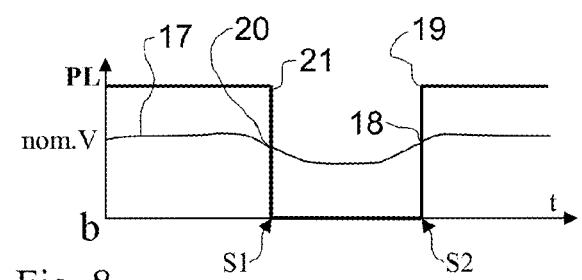

FIG. 8 illustrates the behavior of a standalone variant of the device according to the invention which operates the voltage value for extracting the control setpoint of the power load. In all the timing diagrams shown in the figures, the time is plotted on the abscissa. The appropriate moments of the occurrence of the set points (S, Sn . . . ) are illustrated. The functional status of the power load (PL) is plotted on the ordinate. To clarify the explanation, only the two functional statuses power load off and power load on are represented but the explanations are also valid for power loads having more than two functional statuses involving multiple power levels demanded on the electric network. Similarly, the timing diagrams that illustrate a technical feature of the invention concerning the functional statuses indicated for the power load are not limiting in any way. The appropriate choice of functional statuses will be made depending on the context of implementation of the invention.

In example a) of FIG. 8, the device according to the invention remains disabled as long as the variations of the electrical network voltage 17 remain within a range of values considered to be normal. If the value of the voltage goes over a first threshold 18 and/or the speed of growth of the voltage value exceeds a second threshold, then the supply of the power load controlled by the device 19 is supplied. When the voltage returns below a third threshold 20, which is not necessarily equal to the first, the supply of the power load is cut off 21.

In example b) of FIG. 8, the device according to the invention remains disabled as long as the variations of the electrical network voltage 17 remain within a range of values considered to be normal. If the value of the voltage falls below a first threshold 20 and/or the speed of reduction of the voltage value exceeds a second threshold, then the supply of the power load controlled by the device is cut off 21. When the voltage returns above a third threshold 18, which is not necessarily equal to the first, the supply of the power load is restored 19.

It is particularly preferred in the invention to introduce a highly variable time delay from one device to another. This delay is preferably introduced between the moment of the detection of the disappearance of the fault, which is synchronously detected by all devices in a large part of the electrical network, and the actual change of status of the power loads. Advantageously, changes of status will be desynchronized the more as possible for spreading the power variations to which is exposed the electricity system as a whole.

Figure 9:
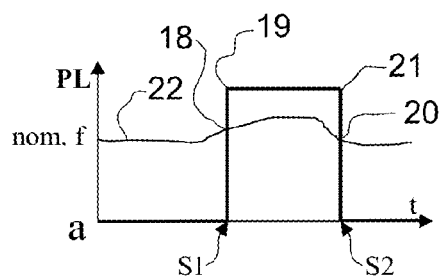
FIG. 9 illustrates a standalone variant operating the frequency.
Figure 9:
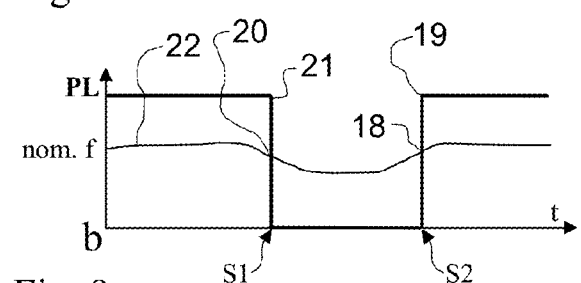

FIG. 9 illustrates the behavior of a standalone variant of the device according to the invention which operates the frequency value of the alternate voltage for extracting the control setpoint of the power load. In example a) of FIG. 9, the device according to the invention remains disabled as long as the variations of the electrical network frequency 22 remain within a range of values considered to be normal. If the value of the frequency goes over a first threshold 18 and/or the speed of growth of the frequency value exceeds a second threshold, then the power load controlled by the device is supplied 19. When the frequency returns below a third threshold 20, which is not necessarily equal to the first, the supply of the power load is cut off 21.

In example b) of FIG. 9, the device according to the invention remains disabled as long as the variations of the electrical network voltage 22 remain within a range of values considered to be normal. If the value of the frequency falls below a first threshold 20 and/or the speed of reduction of the frequency exceeds a second threshold, then the supply of the power load controlled by the device is cut off 21. When the frequency returns above a third threshold 18, which is not necessarily equal to the first, the supply of the power load is restored 19.

As in the example in FIG. 8, it is particularly preferred to introduce a delay time that strongly varies from one device to another between the disappearance of the fault and the resulting change of status of the power loads.

Figure 10:
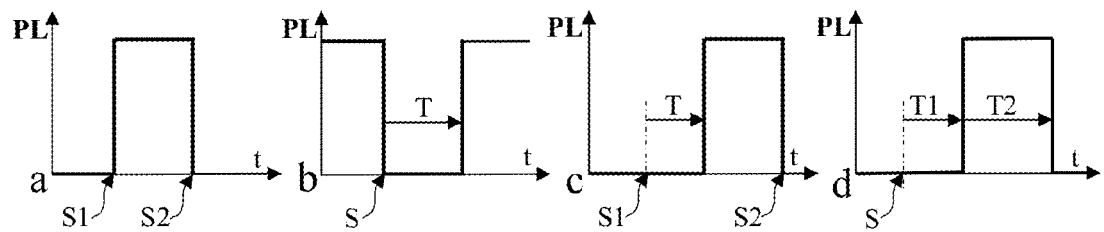
FIG. 10 illustrates the change of status variants of the load.

FIG. 10 a) illustrates a variant of the device according to the invention whereby all changes of status of the power load are due to the occurrence of setpoints in the sense the invention (S1 and S2), i.e. on reception of the remote control commands and/or detection of events affecting the value of the voltage of the network, and/or its frequency, or even to user commands.

(b) illustrates a preferred variant of the device where the first change of status of the power load is due to the occurrence of a setpoint (S). The second change of status of the load is consecutive to the expiry of a delay time of duration T which has been launched at the occurrence of the setpoint (S). This example illustrates the case whereby a setpoint involving a large number of power loads in the electrical network, leads all the loads involved to go to the functional status off synchronously. This can for example be due to the local detection of a problem affecting the value of the electric network voltage and/or affecting its frequency. It can be also the receipt of a remote control order aiming at load shedding. It is advantageous in this case that the time separating the occurrence of the setpoint and the change of functional status of the loads be as short as possible. In the case of a change leading to the functional status off, the synchronism of the event is not a problem for the electrical network. The complementary change of functional status of the power load is controlled locally in each device. It is caused by the expiry of a delay time triggered by the occurrence of the setpoint (S).

c) illustrates the case of a deferred change of functional status. The change of the functional status of the load is managed locally within each device by a time delay of a duration T, which is launched as soon as the event (S1), which should have led to the change of functional status, occurs. The effective change of the corresponding functional status of the power load is done automatically upon expiry of the delay time. The complementary change of functional status is done by the occurrence of an appropriate setpoint (S2).

(d) illustrates the case of a first change of functional status deferred to the expiry of a first delay time of duration T1. The complementary change of functional status is locally controlled within the device on expiry of a second delay time of duration T2.

Figure 11:
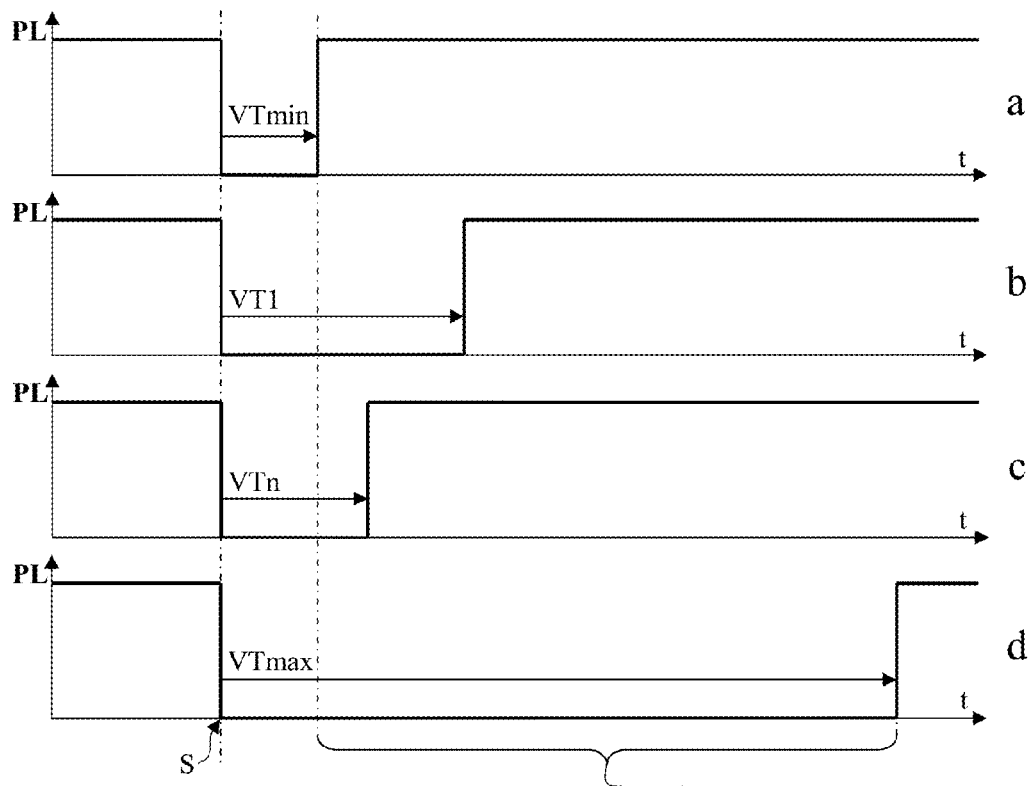
FIG. 11 illustrates a variant in which the delay time is variable.

FIG. 11 illustrates an even more highly preferred variant of the invention where the delay time is variable from one device to another. This variant introduces an individual element of variability for each device in the delay time whose expiry conditions the return to the initial functional status of the power load. The initial functional status is the one before the occurrence of the event that led all devices involved to immediately change their functional status synchronously. The element of variability is designed to maximize the differentiation from one device to the other between a low limit and a high limit allowing the network manager to know in advance the maximum time windows of each of its action. It is thus possible to predict, by simulation using a mathematical model, the behavior of the network in case of a fault having led the devices to have change the functional status of the power load they control in an autonomous way. So in FIG. 12, curve a) illustrates the minimum value of the variable delay time. This value is determined for nevertheless producing an effect on the electrical network and for protecting the power load from the possible harmful effects of excessively short switching cycles. Curve b) illustrates a first delay time value for a given device. Curve c) illustrates the delay time value specific to the nth device according to the invention present in the electrical network and having detected the same event as those associated to the curves a) and b). Curve d) illustrates the maximum value that the variable delay time can take in the frame of a given implementation of the invention. The duration 23 represents the maximum time excursion of the variable part of the delay time.

Figure 12:
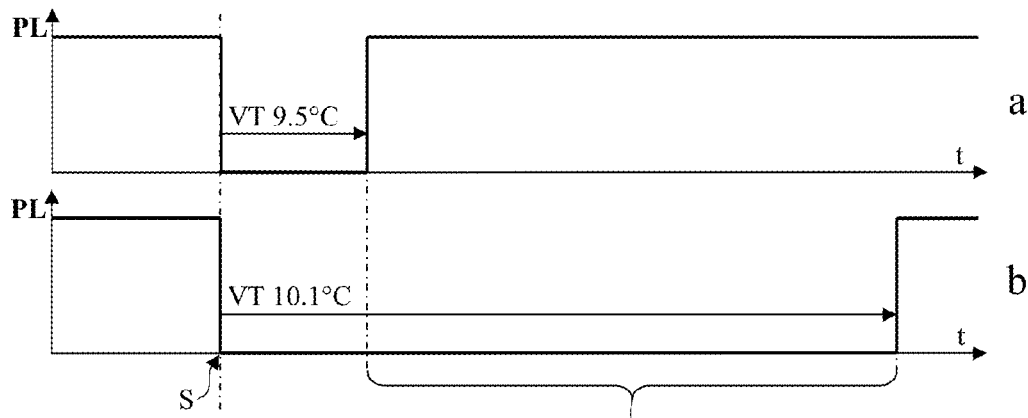
FIG. 12 illustrates a variant in which variability comes from the environment.

FIG. 12 illustrates a variant in which variability comes from the environment.

The two curves a) and b) of FIG. 12 illustrate an example of an environmental variable that can be used in the calculation of the duration of the delay time of each device. The calculation method used in the program of the microcontroller implementing the invention is designed in that the result in terms of delay time which is framed by a minimum value and a maximum value, in that the probability of obtaining the same values is low and in that the individual values are highly differentiated from each other. The duration 23 represents the maximum time excursion of the variable part of the delay time according to an environmental variable. In this example, the temperature is the environmental variable chosen because its variability potential from one device to another is high and because modern microcontrollers that include an analog-to-digital converter also usually include a way to measure the temperature of the chip. This choice allows the implementation of this development of the invention at a zero marginal cost apart from that of the necessary additional code storage.

Figure 13:
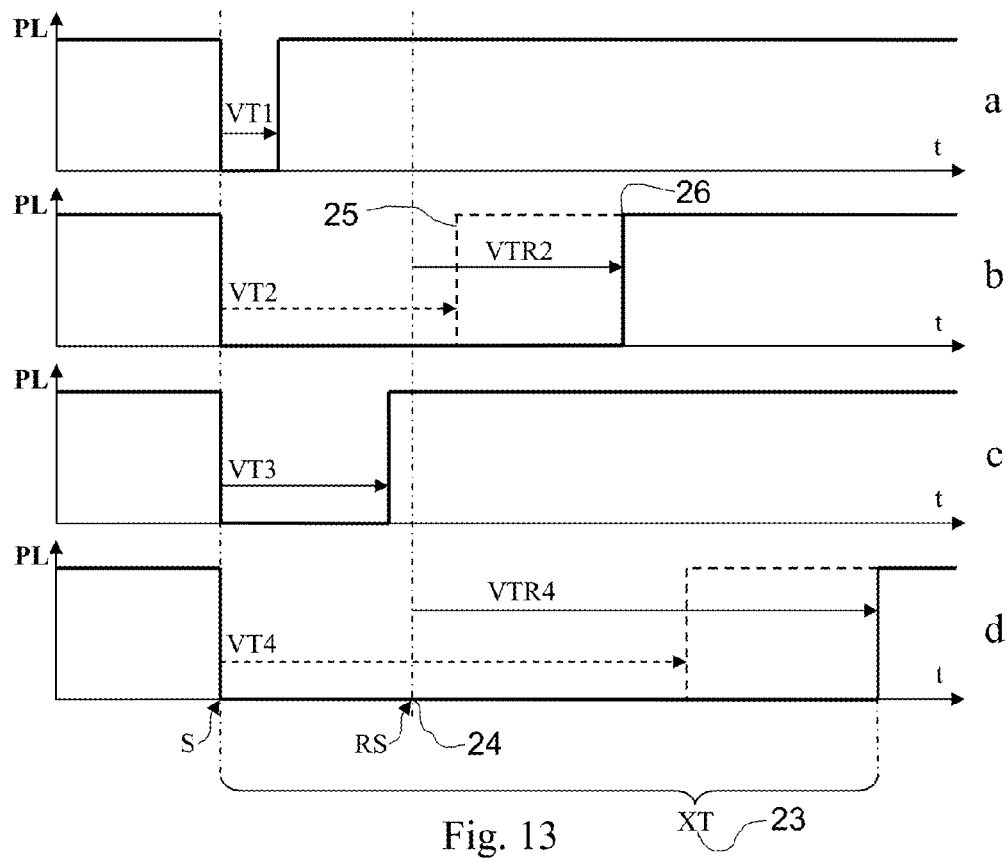
FIG. 13 illustrates a variant in which delay times are restarted.

FIG. 13 illustrates a variant in which the delay times are restarted.

This figure illustrates a functional refinement of the invention that allows the network manager for spreading out the power peak further if necessary by repeating the transmission of the original command at judiciously chosen times by means of a tool to assist in running the electrical network by simulation. In this example, for curves a) and c), everything goes as illustrated previously by FIG. 11 because their delay time expires before receiving a repeated command 24, or before the reception of a specific command for the restart of delay times as appropriate.

For curves b) and d), delay times of devices have not yet expired when the new command 24 is received. The refinement of the invention then operates by restarting the delay times on those apparatuses only. This has the effect of more spreading out the power peak by involving a number of devices that decrease until it is no longer necessary to repeat the command. The duration 23 represents the maximum time excursion of the variable part of the delay time after extension by repetition of the commands.

This functional refinement of the invention increases the flexibility and possibilities for spreading out the power peak without the need for additional resources for its implementation and without significantly increase traffic on the network.

Figure 14:
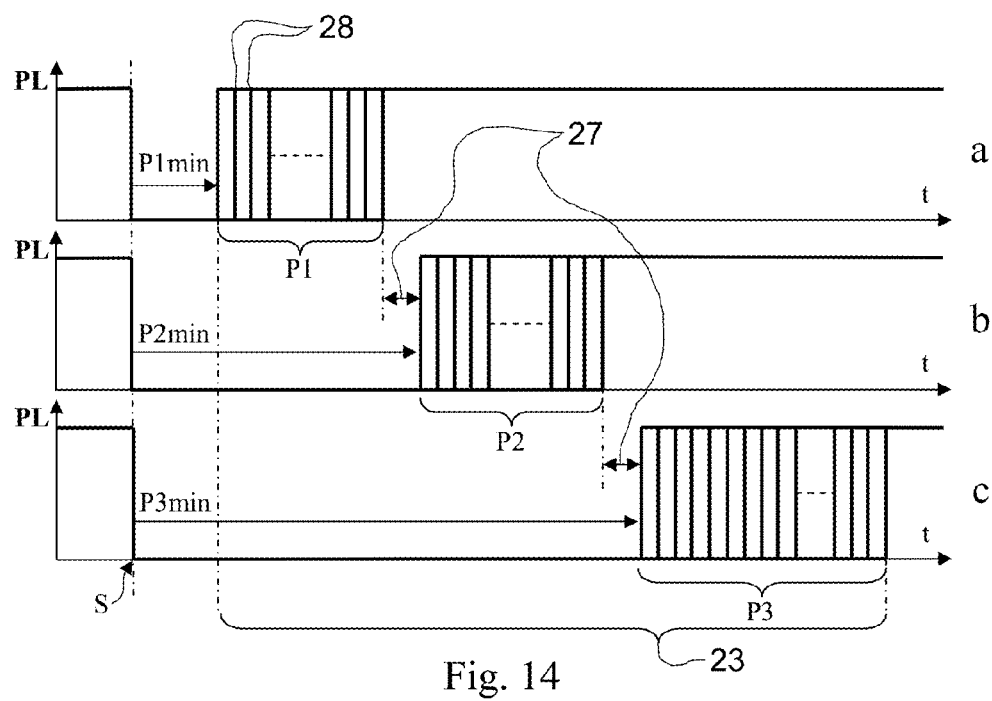
FIG. 14 illustrates a variant with priority management.

FIG. 14 illustrates a variant with priority management.

This figure illustrates the management of priorities in access to electric power according to the invention. The devices according to the invention are arranged for controlling several levels of priority. Each participating device must know the level of priority allocated to it. This can be done during the manufacture of the device or of the apparatus containing it in the case of priorities depending on electrical uses or of the power of the load. In the other cases, local settings for each device, or even remote settings according to the possibilities of the communication system of the network, are necessary. The three time diagrams a), b) and c) correspond to three levels of priorities managed according to the method of the invention. The method is applicable to any number of priority levels.

Each priority level is attached to a time range within which all the delay times of the relevant devices have to expire. Delay times of devices that are associated with the immediately lower priority level are advantageously increased by a fixed security value 27 for avoiding any overlap at the boundaries of adjacent priority levels, given possible drifts and uncertainties in the calculations of the values of the delay time. A minimum value is also advantageously added ahead of the highest priority level for the reasons explained in the description of FIG. 11.

The figure also illustrates the management of delay times within a temporal chart whose number and length of elementary steps 28 are predetermined. This functional refinement facilitates the modeling of the behavior of the system, which is an interesting complement of the invention for facilitating its implementation in the frame of a deterministic management of the electrical network.

A delay time within a temporal chart does not at all contradict the use of an environmental variable or a pseudo-random variable in the calculation of the values of delay times. It only indicates that the calculated values are discretized before their use for falling in the steps of the chart, the latter being synchronized in all devices affected by the initial synchronous event (S).

Figure 15:
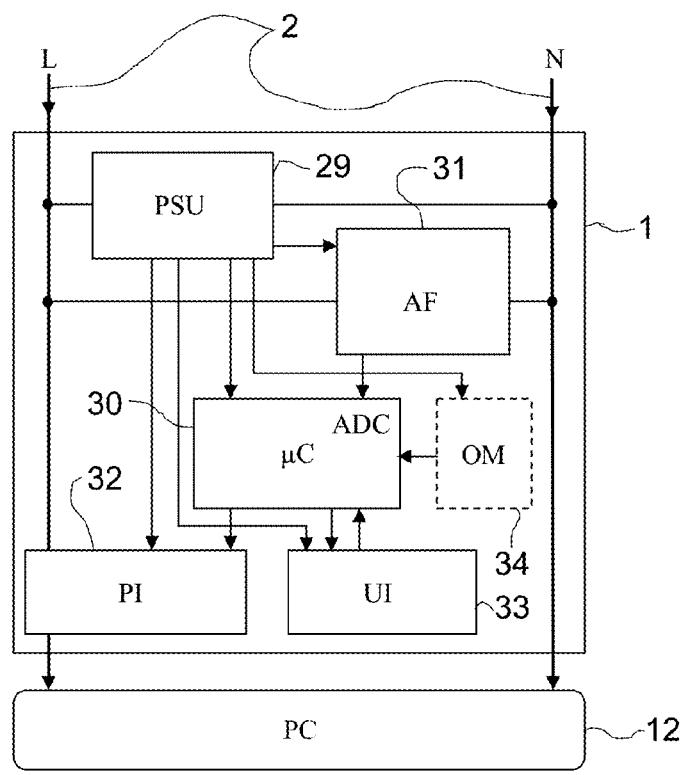
FIG. 15 illustrates a preferred variant of the device.

FIG. 15 illustrates a preferred variant of device 1 when the power load is external.

This variant comprises a low voltage power supply subassembly 29 providing the voltage required for the operation of the other subassemblies from the voltage of the electrical network 2 to which it is connected. At the heart of the device is the microcontroller 30 which controls the resources of the device through, a software contained in its program memory, a working RAM memory, a non-volatile memory for permanent storage of operating settings and relevant functional statuses, and embedded peripherals such as an analog-to-digital converter. Models of the "tiny" 8 bit AVR microcontroller family from Atmel, registered trademarks, or models of the "MSP430" 16 bit microcontroller family from Texas Instruments, registered trademarks, are particularly preferred, but this type of common electronic component exists also at other semiconductor manufacturers. An analog front-end 31 formats, and possibly pre-filters, the signals from the electric voltage of the installation before converting them in the microcontroller for performing the appropriate digital processes. A power interface 32 comprising a relay and its control electronics ensures a functional link between the corresponding logical output of the microcontroller and the power load to be controlled. A user interface 33 comprising at least one push button and one led allows interaction between the device and the user.

The optional subassembly 34 represents a low voltage power-line modem or a radio transceiver according to the characteristics of the communication means used by the electricity distributor for managing its network. When this will be possible, it will be preferred to only implement the receiving parts of modems and transceivers.

Figure 16:
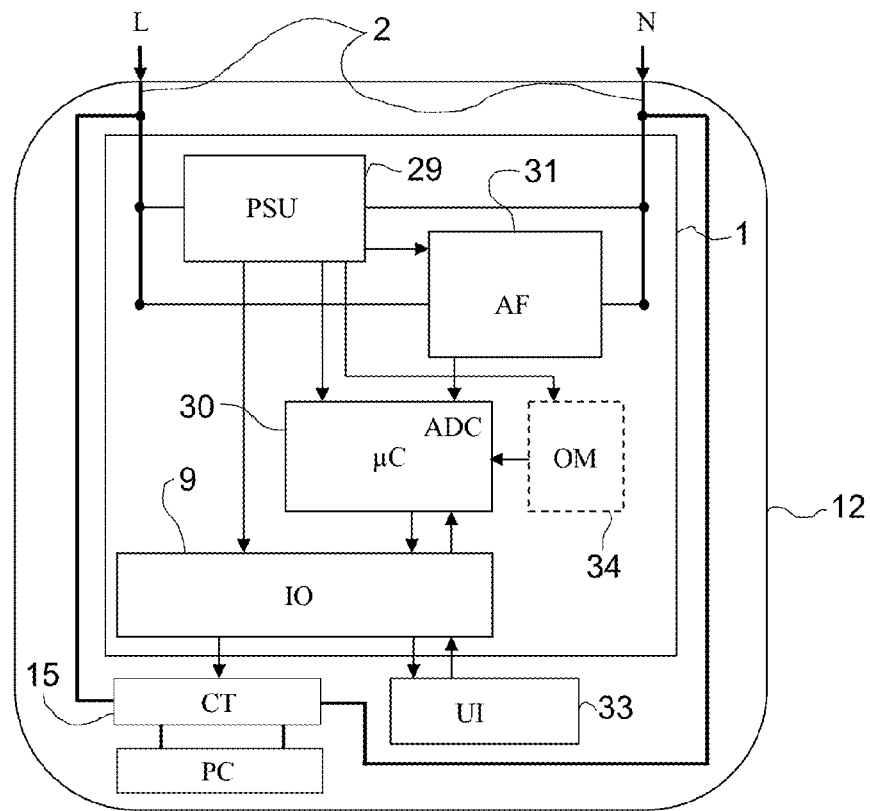
FIG. 16 illustrates another preferred variant of the device.

FIG. 16 illustrates another preferred variant of implementation of the device when it is integrated within an apparatus 12 comprising at least one power load. FIG. 16 differs from the previous one in that the device according to the invention 1 is integrated into an apparatus of which it uses the means for controlling the supply 15 of at least one power load and the user interface means 33 that are often more user-friendly in a sophisticated apparatus than the simple button and the led provided in the basic version of the device according to the invention.

Of course, the invention is not limited to the exemplary embodiments which have just been described. Many arrangements may be provided to these examples without departing from the scope of the invention, in particular by combining several variants in the same implementation or by combining differently elements taken in several examples.

The invention claimed is:

1. A device (1) for controlling the operation of a power load (12) belonging to a terminal electrical installation (2) according to events which are related to the operation or management of an electrical network (16), said device comprising:
   a low voltage power supply (29), a microcontroller (30), a program memory, a working RAM memory, a non-volatile memory, an analog front end connected to the electric voltage of said terminal electrical installation;
   a functional block (7) implemented in software executed in said microcontroller and with at least one electronic component for extracting at least one autonomous setpoint from the voltage value of said terminal electrical installation and/or from its evolution over the time, and/or from the frequency value of the alternating voltage of said terminal electrical installation and/or from its evolution over the time;
   software and/or electronic means (3, 8, 10) for receiving at least one remote control command by radiofrequency and/or by ripple control and/or by PLC and/or by an interface with wired electrical communications means and/or by an interface with wired or wireless optical communications means;
   a functional block (4) implemented in software executed in said microcontroller and with at least one electronic component for changing power demand to said electrical network through the control of the functional status of said power load according to the at least one autonomous setpoint extracted and/or to the at least one remote control command received.

2. The device according to claim 1, further comprising a relay for switching the power supply of the power load to be controlled.

3. The device according to claim 1, further comprising an interface (9) and/or a remote control transmitter (11) for controlling the operation of a power load integrated into a remotely controllable apparatus (12).

4. The device according to claim 1, wherein the reception of a first remote control command and/or the extraction of a first autonomous setpoint and/or the arrival at the expiry of a delay time put the power load in a determined functional status for an indefinite period of time, the putting of the power load in an other functional status requiring the reception of a second remote control command and/or the extraction of a second autonomous setpoint associated with said other functional status.

5. The device according to claim 1, wherein the reception of a remote control command and/or the extraction of an autonomous setpoint put the power load in a determined functional status, the power load being automatically put into another functional status on arrival at the expiry of a delay time.

6. The device according to claim 5, wherein said delay time is discretized within a temporal chart whose number and length of elementary time steps are predetermined, said time steps being synchronized in all devices affected by an initial synchronous event (S).

7. The device according to claim 5, wherein the delay time includes at least one variable part.

8. The device according to claim 7, wherein the variable part of the time delay is at least partly used as part of priority management in access to electrical power.

9. The device according to claim 5, wherein the duration of all or part of said delay time is modified by the program executed in said microcontroller when at least one second remote control command is received over a period of time of a predetermined duration which starts from the reception of a first remote control command.

10. The device according to claim 5, wherein the reception of a remote control command restarts the delay times which have not expired, the devices in which the delay time has expired being insensitive to any new reception of a remote control command during a predetermined period of time.

11. The device according to claim 1, further comprising a human-machine interface that allows the user to make the device insensitive, at least temporarily, to any setpoint to which it would normally be sensitive, and/or to impose at least one functional status to the power load.

12. The device according to claim 11, wherein said human-machine interface is designed so that the next user's action on them will have the most expected effect given the current functional status of the device.

13. The device according to claim 1, further comprising at least two interfaces for inserting said device between two other apparatuses installed for controlling a power load according to the tariff of electric energy in a terminal electrical installation, or between one other apparatus installed for controlling a power load according to the tariff of electric energy in a terminal electrical installation and at least one power load.

14. The device according to claim 1, wherein the control of the power load takes into account the tariff of electric energy.

15. A method to be implemented in software in a device comprising a low voltage power supply, a microcontroller, a program memory, a working RAM memory, a non-volatile memory, an analog front end connected to the electric voltage of a terminal electrical installation; a functional block (7) implemented in software executed in said microcontroller and with at least one electronic component for extracting at least one autonomous setpoint from the voltage value of said terminal electrical installation and/or from its evolution over the time, and/or from the frequency value of the alternating voltage of said terminal electrical installation and/or from its evolution over the time; software and/or electronic means for receiving at least one remote control command by radiofrequency and/or by ripple control and/or by PLC and/or by an interface with wired electrical communications means and/or by an interface with wired or wireless optical communications means; a functional block (4) implemented in software executed in said microcontroller and with at least one electronic component for changing power demand to said electrical network through the control of the functional status of said power load according to the at least one autonomous setpoint extracted and/or to the at least one remote control command received and/or to a time delay having expired and/or to a command from a user, for controlling the operation of a power load belonging to said terminal electrical installation for the purpose of managing an electrical network by using a plurality of said devices, said method implemented in software in said microcontroller comprising the steps of:

extraction at least one autonomous setpoint from the voltage value of the terminal electrical installation and/or from its evolution over the time, and/or from the frequency value of the alternating voltage of said terminal electrical installation and/or from its evolution over the time and/or reception of at least one remote control command;

modification of the functional status of the power load according to said at least one autonomous setpoint that has been extracted and/or to the at least one remote control command that has been received and/or to a delay time that has expired and/or to a command from the user.

16. The method according to claim 15, further comprising a step of desynchronization of at least one change in functional status of power load controlled by one of the devices, relatively to changes in functional status of at least one other power load controlled by at least one other of the devices within an electrical network having a similar effect in terms of power demand to the network.

17. A system for managing an electrical network, comprising:

a plurality of devices comprising a low voltage power supply, a microcontroller, a program memory, a working RAM memory, a non-volatile memory, an analog front end connected to the electric voltage of a terminal electrical installation, a functional block (7) implemented in software executed in said microcontroller and with at least one electronic component for extracting at least one autonomous setpoint from the voltage value of said terminal electrical installation and/or from its evolution over the time, and/or from the frequency value of the alternating voltage of said terminal electrical installation and/or from its evolution over the time; software and/or electronic means for receiving at least one remote control command by radiofrequency and/or by ripple control and/or by PLC and/or by an interface with wired electrical communications means and/or by an interface with wired or wireless optical communications means; a functional block (4) implemented in software executed in said microcontroller and with at least one electronic component for changing power demand to said electrical network through the control of the functional status of said power load according to the at least one autonomous setpoint extracted and/or to the at least one remote control command received and/or to a time delay having expired and/or to a command from a user;

an electrical network to which said terminal electrical installation is connected.

18. The system according to claim 17, further comprising at least one management software based on modeling of the behavior of said devices in the electrical network to help run the network and/or for automatic running of the network.

19. The system according to claim 18, further comprising remote control means that are operatively connected to said management software for transmitting relevant commands to said devices in said electrical network.

20. The system according to claim 18, wherein said at least one management software is operatively connected to an upstream information system involved in the management of the electrical network for operational and/or for supervision purpose.

\* \* \* \* \*